April 11, 1961 J. H. HEIDORN 2,978,879
REFRIGERATING APPARATUS
Filed June 30, 1958
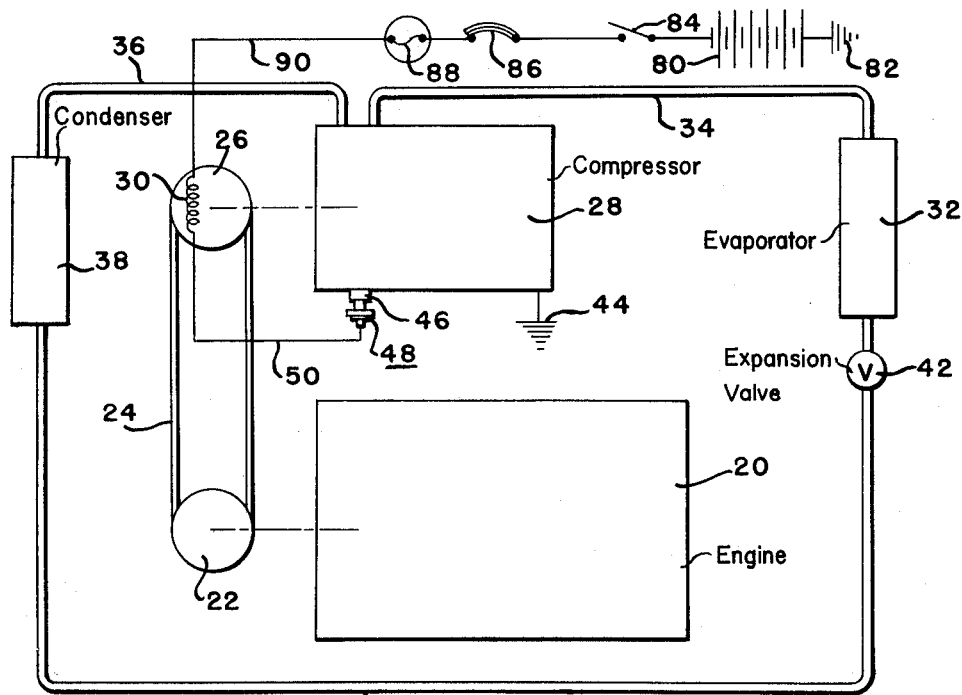
Fig. 1
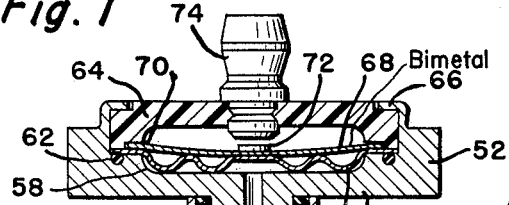
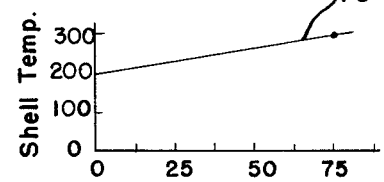
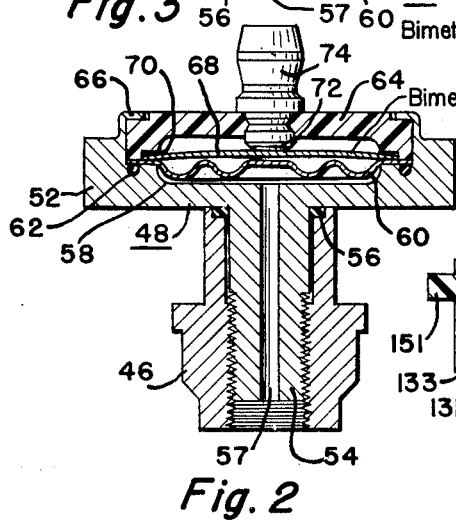
INVENTOR.
John H. Heidorn
BY Edwin S. Dybvig
His Attorney United States Patent Office 2,978,879
Patented Apr. 11, 1961

2,978,879

REFRIGERATING APPARATUS

John H. Heidorn, Dayton, Ohio, assignor to General Motors Corporation, Detroit, Mich., a corporation of Delaware Filed June 30, 1958, Ser. No. 745,735

3 Claims. (Cl. 62—209)

This invention relates to refrigerating apparatus and especially to the protection of refrigerating systems from damage because of the depletion of the refrigerant and lubricant by leakage or otherwise.

Since automotive air conditioning refrigerating systems are powered by the same automobile engine used to drive the car, it is not practical to use a hermetically sealed system. Consequently, the refrigerating system is subject to leakage and occasionally, such systems do leak. Not only does the refrigerant leak out but some of the oil lubricant also leaks away with the refrigerant and excessive amounts collect in the evaporator. In such cases, it is necessary to add refrigerant and lubricant to the system. When this is not done and the leakage continues, the compressor overheats and may become starved of lubricant and be seriously damaged for lack of proper cooling and lubrication.

It is an object of this invention to prevent the operation of the refrigerant compressor whenever the lubrication is insufficient.

It is another object of this invention to prevent operation of the compressor whenever the temperature of the compressor and the suction pressure of the refrigerant are, respectively, above and below predetermined levels indicative of the failure of lubrication.

These and other objects are attained in the form shown in the drawings in which a control is connected to the usual drain plug connection of the compressor and incorporates a diaphragm responsive to the pressure within the suction chamber of the compressor and a dished snap-acting bimetal disc alongside the diaphragm capable of snapping at predetermined temperatures from its normal position into an abnormal position where it will disconnect the power supply for disengaging the magnetic clutch which controls the connection of the compressor with the driving engine of the car.

Further objects and advantages of the present invention will be apparent from the following description, reference being had to the accompanying drawings wherein a preferred embodiment of the present invention is clearly shown.

In the drawings:

Figure 1 is a diagrammatic representation of an automobile air conditioning refrigerating system embodying one form of my invention;

Figure 2 is an enlarged cross-sectional view of the control shown in Figure 1 embodying my invention shown in the normal position;

Figure 3 is a fragmentary sectional view of the control shown in Figure 2 in the position for preventing operation of the compressor;

Figure 4 is an enlarged cross-sectional view of a modified form of the invention shown in the normal position;

Figure 5 is a fragmentary enlarged cross-sectional view of the form shown in Figure 4 with the control shown in position to prevent operation of the compressor; and Figure 6 is a compressor temperature and suction inlet pressure chart showing the correlation of temperature and pressure beyond which it is desired to prevent operation of the compressor.

Referring now more particularly to Figure 1, there is indicated diagrammatically an automobile engine 20 which, through the pulley 22, the belt 24 and the magnetic clutch pulley 26, drives the compressor 28 of an automobile air conditioning system. The magnetic clutch pulley 26 includes a magnetic clutch 30 providing a driving connecting between the pulley 26 and the compressor 28 when energized, and disconnecting the pulley 26 from the compressor 28 when it is deenergized. A battery 80 having one side connected to the ground and the other side connected to a manual switch 84, a thermostatic switch 86, a fuse 88 and a conductor 90 supplies the electric energy to the magnetic clutch 30.

The compressor 28 pumps evaporated refrigerant from the evaporator 32 through a suction conduit 34 extending to the suction inlet of the compressor 28 and discharges the compressed refrigerant through the discharge conduit 36 to the condenser 38. The condenser 38 condenses the refrigerant which then flows through the liquid line 40 and an expansion valve or other refrigerant flow control device 42 into the evaporator 32. The compressor 28 is grounded as indicated at 44. The compressor 28 is also provided with a drain-plug connection 46 connecting with the crankcase portion which is under the suction inlet pressure.

According to my invention, there is connected to the drain plug entrance 46 a control 48 which will normally connect the magnetic clutch 30 through the conductor 50 and the compressor 28 to the ground 44. As better shown in Figures 2 and 3, this control 48 includes a housing 52 having a threaded extension 54 which is threaded into the drain-plug connection 46 provided with a sealing gasket 56 for preventing leakage. The housing 52 includes a large circular flanged portion containing a shallow recess 58 communicating through the passage 57 in the threaded portion with the crankcase of the compressor 28. Within this shallow recess 58 is a thin corrugated metal diaphragm 60 having its peripheral flange resting upon the annular sealing gasket 62. The rim of the diaphragm 60 is held in sealing relation with the sealing gasket 62 by the adjacent flanges of the cover 64 which is of electrical insulating material. The cover 64 is held in place by having a protruding flange 66 spun over its edges. The cover 64 is also provided with a shallow recess containing a dished snap-acting bimetal disc or temperature sensing device 68. The edges of this disc 68 are held between the rim of the diaphragm 60 and the shoulder 70 provided on the cover 64. The disc 68 is provided with a centrally located contact 72 which is normally in engagement with the centrally located electrode 74 in the cover 64.

It has been found that if there are refrigerant leaks in the system, a certain amount of lubricant is likely to leak out with the refrigerant and excessive amounts will accumulate in the evaporator. If the supply of refrigerant and lubricant is not replenished, there is danger that the cooling of and the lubrication in the compressor will fail and the compressor will overheat and become damaged by continued operation. It has been determined that if operation of the compressor is prevented when its temperature is above the line 76 in Figure 6 correlated with the pressure as shown therein, that the compressor will be protected from damage and yet will be permitted to operate under substantially all normal conditions wherein there is no danger of damage.

The arrangement shown in Figures 2 and 3 is such that at 0 pounds crankcase or suction pressure, the diaphragm 69 will allow the bimetal or temperature sensing device 68 to snap from the position shown in Figure 2 to the position shown in Figure 3 when its temperature rises above 200° F. As the crankcase or suction inlet pressure rises, the diaphragm 60 will press more and more against the central portion of the disc 68 and delay its snapping according to the line 76 in Figure 6. Thus, if the crankcase or suction pressure should rise to 75 pounds, the bimetal disc 68 will not snap until the temperature rises above 300° F. When the bimetal disc 68 snaps to the position shown in Figure 3, the magnetic clutch will be disconnected from the ground 44 and therefore no current can flow through it. This will prevent operation of the compressor by keeping the clutch disengaged. This will serve as a warning to the owner of the car to cause him to go to a service station and have refrigerant and oil lubricant added to the system.

In Figures 4 and 5 a different form is provided having, in addition, a visible warning signal. In this form there is also provided a body 121 having a threaded portion 123 connecting with the oil drain plug connection 46. The body 121 contains a shallow recess 125 communicating through a passage 127 extending to the threaded portion 123 for connection through the drain plug connection 46 to the crankcase of the compressor 28. The recess or chamber 125 contains an annular groove 129 receiving the peripheral flange 131 of a cup-shaped diaphragm 133 of elastomeric material. This diaphragm 133 has the peripheral flange 131 held in the groove 121 by the projecting rim 135 which is spun over the flange 131 to hold it in place. The diaphragm 133 bears against the central portion of a snap-acting dished bimetal disc 137 also in chamber 125.

The chamber 125 is enclosed in a metal cover 139 held in place by the spun-over rim 141 extending from the body 121. It is provided with a centrally located electrode 143 in an insulating bushing 145, both of which extend through the cover 139. The inner end of the electrode 143 is provided with a spherical shaped rocket 147 receiving a small metal ball 149. This ball 149 is held within an aperture in the inner end of the laterally movable control member 151 of electrical insulating material, the outer end of which projects through the opening 153 in the wall of the valve body 121. This opening 153 guides the member 151. The member 151 is provided with a shoulder 155 against which presses a small compression-type coil spring 157 tending to push the outer end of the member 151 outwardly.

When there is sufficient upward force on the ball 149 by the bimetal disc 137 and the diaphragm 133, it will be held in the recess 147 at the inner end of the electrode 143, as shown in Figure 4. The bimetal disc 137 is normally held against the anular shoulder 159 by the diaphragm 133 substantially in accordance with the pressure in the crankcase of the compressor 28. The bimetal 137 is so made that at 0 pressure it will snap from the position shown in Figure 4 to the position shown in Figure 5 at about 200° F. The diaphragm 133, as the crankcase pressure rises, delays the snapping of the bimetal disc 137 in accordance with the line 76 shown in Figure 6. When the bimetal 137 snaps, the force upon the ball 149 is released and the slide member 151 is propelled outwardly by the spring 157 to the position shown in Figure 5. This disconnects the electrode 143 connected by the connector 161 and the conductor 50 to the clutch 30 from the ball 149 and the bimetal disc 137 which connects electrically through the housing 121 and the compressor 28 to the ground 44. This prevents the operation of the compressor 28. The protruding end of the slide member 151 provides a visual indication of the tripping of this control device and serves as indication to the owner that refrigerant and lubricant should be added to the system. This control, therefore, also will prevent operation of the compressor under conditions which indicate a possible failure of lubrication.

While the embodiments of the present invention as herein disclosed constitute a preferred form, it is to be understood that other forms might be adopted.

What is claimed is as follows:

1. Refrigerating apparatus containing a refrigerant including a compressor having a suction inlet and a discharge outlet, a condenser and a flow controlling device and an evaporator connected in circuit between said outlet and inlet, drive means for said compressor, and means responsive to the combined effect of the temperature of the compressor and the refrigerant pressure within the compressor for preventing operation of said compressor.

2. Refrigerating apparatus containing a refrigerant including a compressor having a suction inlet and a discharge outlet, a condenser and a flow controlling device and an evaporator connected in circuit between said outlet and inlet, drive means including electrical means for driving said compressor, switch means connected in electrical series circuit with said electrical means, and means responsive to the combined effect of the temperature of the compressor and the refrigerant pressure within the compressor for opening said switch means.

3. Refrigerating apparatus containing a refrigerant including a compressor having a suction inlet and a discharge outlet, a condenser and a flow controlling device and an evaporator connected in circuit between said outlet and inlet, drive means including electrical means for driving said compressor, said compressor including refrigerant passages connecting with said outlet and inlet, and means having a control portion mounted upon said compressor and connecting with one of said passages and responsive to the combined effect of the temperature of the compressor and the refrigerant pressure in said one passage for preventing operation of said compressor.

References Cited in the file of this patent

UNITED STATES PATENTS

| | | |
|---|---|---|
| 1,947,884 | Spencer | Feb. 20, 1934 |
| 2,088,491 | Smith | July 27, 1937 |
| 2,169,554 | Buchanan | Aug. 15, 1939 |
| 2,200,477 | Newton | May 14, 1940 |
| 2,387,117 | Buehler | Oct. 6, 1945 |
| 2,390,650 | Hollatz | Dec. 11, 1945 |
| 2,454,288 | Michaelson | Nov. 23, 1948 |
| 2,534,455 | Koontz | Dec. 19, 1950 |
| 2,562,286 | Wall | July 31, 1951 |
| 2,582,483 | Hallerberg | Jan. 15, 1952 |
| 2,785,246 | Mejean | Mar. 12, 1957 |
| 2,898,928 | Kehoe | Aug. 11, 1959 |